Aug. 3, 1926.
G. ISAAC
TIN CUTTER
Filed July 1, 1925
1,594,671
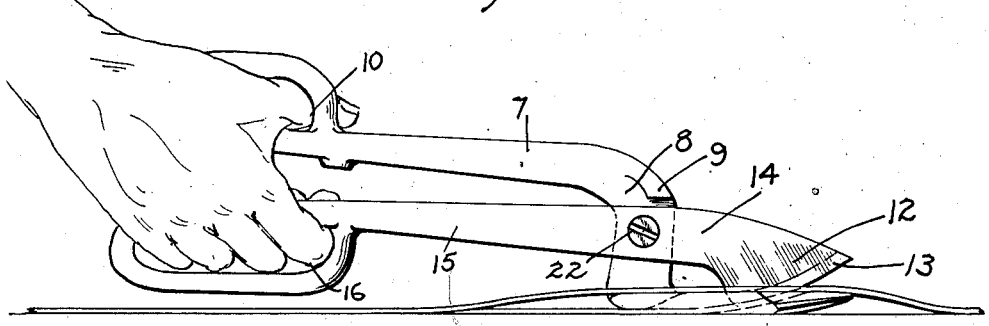
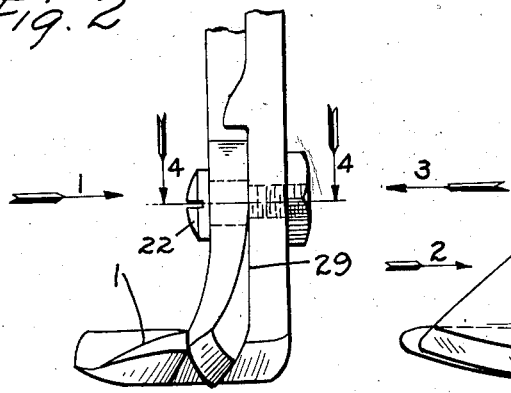
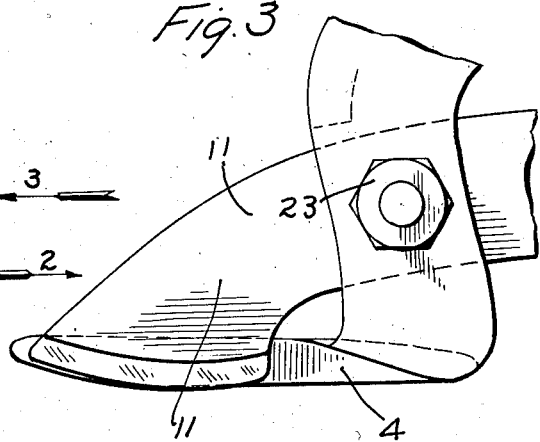
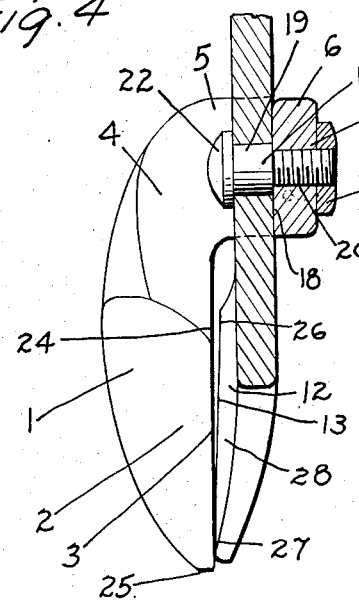
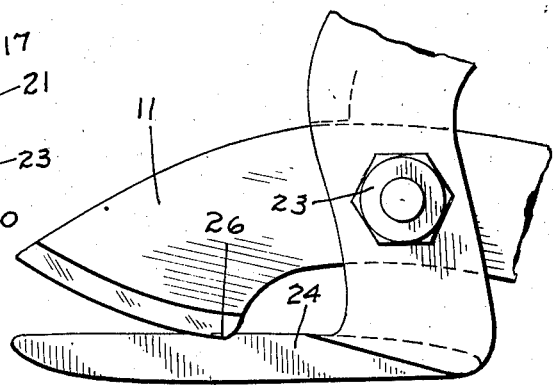
Inventor,
George Isaac.
by: Hazard and Miller
Attys.

Patented Aug. 3, 1926.

1,594,671

UNITED STATES PATENT OFFICE.

GEORGE ISAAC, OF SHAFTER, CALIFORNIA.

TIN CUTTER.

Application filed July 1, 1925. Serial No. 40,869.

My invention is a tin cutter adapted for cutting thin sheet tin or other sheet metal and is particularly designed to facilitate the cutting of curves or irregular outlines in the body of the sheet.

In cutting sheet metal with the scissors type of shears and particularly with those having the handles in alinement with the shear blades it is very difficult to cut curves or other irregular designs in the body of the metal as this brings the hand in the plane of the sheet either cutting the hand or requiring distortion of the sheet.

My invention particularly relates to a hand operated cutter but may be applied to a power device and comprises a lower cutting blade having a guiding platen to follow below the surface of the plate being cut with a co-acting pivoted cutting blade above the sheet and with the handles extending above the sheet.

My invention will be more readily understood from the following description of the drawings in which:

Figure 1 is a side elevation of my cutter in operation in the direction of the arrow 1 of Fig. 2.

Fig. 2 is a front elevation of the cutting blades in the direction of the arrow 2 in Fig. 3.

Fig. 3 is a side elevation of the cutting blade in the direction of the arrow 3 of Fig. 2.

Fig. 4 is a horizontal cross section on the line 4—4 of Fig. 2 in the direction of the arrows.

Fig. 5 is a view similar to Fig. 3 with the upper blade elevated in position for starting a cut.

The cutter has what may be termed a standing blade 1 which has a tip portion 2 with the cutting edge 3 formed thereon and the rear platen portion 4 which may be termed a riding surface. The platen has a side extension 5 from which rises the pivot bar 6, from which extends a handle 7 by a curved section 8. A stop lug 9 is formed on the curved section and a suitable hand grip 10 on the end of the handle.

The moving blade 11 is constructed with a cutting portion 12 having a sharpened knife edge 13. A lever section 14 extends backwardly from the blade and has a handle section 15 with a hand grip 16.

The standing blade and the moving blade are pivoted together in any suitable manner; that shown being by means of a pivot pin 17 which has a cylindrical section 18 engaging in the aperture 19 of the lever section 14 of the moving blade and having the smaller section 20 engaging an aperture 21 in the pivot bar 6 of the standing blade. A head 22 on one side and a clamp nut 23 on the other secures the blades together in an adjustable manner, allowing slight adjustment thereof.

The cutting edge 3 of the standing blade is substantially straight from the inner portion 24 to the outer tip 25, whereas the knife edge 13 of the moving blade is slightly curved from its base 26 to the tip 27 and the cutting portion 12 is slightly concaved as indicated at 28. The face 29 of the pivot bar, against which the lever section 14 bears, is flat and substantially parallel to the cutting edge 3 of the standing blade.

The operation of my cutter is substantially as follows:

The standing blade will be inserted underneath the sheet to be cut and preferably rest on the supporting surface such as a table with the platen portion sliding thereon. When the blades are open to their fullest extent as shown in Fig. 5 the stop lug 9 engages the upper edge of the lever section 14 limiting the upward movement of the moving blade 11. This positions the base 26 of the cutting edge 13 substantially on a level or slightly below the upper surface of the tip portion 2 of the standing blade and forward of the inner portion 24. As the handles are squeezed together the moving blade 14 swivels in the direction of the arrow shown in Fig. 5 conveying a pressing as well as a sliding cut to the sheet positioned between the two blades.

The slight curve in the knife edge 13 allows each portion to form a close contact with the cutting edge 3 of the standing blade during the whole extent of the cut and the slightly concaved portion of the moving blade 28 allows the blades to pass clear of each other after the cut is made. The adjustment of the pivot pin 17 allows securing the proper pressure against the knife blade and the cutting edge of the moving and standing blades.

It will be apparent that the same type of cutting blades with a similar mounting could be utilized in power driven machines and that the cutter could be held stationary while the sheet is moved to cut the proper design.

My cutter will readily cut curves in both directions but in the operation of extensive cutting of curves in different directions it is preferable to make the cutter in left and right hand designs and by giving the blades a slight curvature, curves of various diameters may be readily followed.

The design of my cutter may be materially changed in size and in the particular shape of the element of construction to be adapted for cutting different materials and may also be made of light weight for cutting materials such as paper, cardboard, textile fabrics or the like in which it is desired to follow a pattern and may be thus utilized to advantage for cutout wall paper work.

Having described my invention, what I claim is:

1. A cutter comprising in combination a lower blade having a substantially flat and broad construction, a platen portion extending rearwardly from the blade, the portion adjacent the cutting edge of the lower blade and the platen portion being flat on the bottom surface, the cutting edge of the blade being substantially straight, an extension sideways from the platen portion substantially at right angles to the cutting edge of the lower blade and towards the same side as said edge, a pivot bar section extending upwardly from the said extension and having a handle connected thereto, an upper blade having a lever section with a handle connected thereto, a pivot pin forming a pivotal connection for the lever section and the pivot bar section, the cutting edge of the upper blade being convex in profile.

2. A cutter comprising in combination a lower blade having a substantially flat and broad construction, a platen portion extending rearwardly from the blade, the cutting edge of the lower blade being substantially straight and the said blade being flat on the bottom surface with a slightly convex curved front end, an extension sideways from the platen portion substantially at right angles to the cutting edge of the lower blade, a pivot bar section extending upwardly, having an inner face substantially parallel to the cutting edge of the lower blade and having a handle connected thereto extending in the opposite direction to the blade and substantially parallel thereto, an upper blade having a lever section with a handle extending therefrom, extending over the extension of the platen, bearing against the inner surface of the pivot bar section, between said bar and the edge of the lower blade, a pivot pin connecting the lever section and the pivot bar section of the two blades together, the upper cutting blade being curved laterally inward from the plane of the lever section, towards the cutting edge of the lower blade and the profile of the cutting edge being formed convex, a stop lug on the upper portion of the pivot bar section of the lower blade, adapted to engage the upper blade and the handle of the upper blade when engaged by the stop being substantially parallel to the lower blade.

3. A cutter having a lower blade with a flat blade structure, the base of the blade portion being flat and of greater length than width, a straight cutting edge 3 adjacent the upper surface of the blade portion, the tip portion 2 having an outwardly inclined slope from the straight cutting edge 3 and having a rear platen portion 4 downwardly inclined towards the rear, a side extension 5 at substantially right angles to the cutting edge 3, a pivot bar section 6 extending upwardly from the extension 5 and having an inner surface parallel to the cutting edge 3, a curved section 8 above the pivot bar section, a handle 7 extending rearwardly from the curved section, a cutting blade having a lever section 14 pivotally connected on the inside face of the pivot bar section of the lower blade, a handle 15 extending rearwardly therefrom, a cutting portion 12 extending forwardly, the cutting portion 12 being offset laterally from the lever section and having a slight concaved curve 28 towards the cutting edge of the stationary blade, the upper blade also having a sharpened knife edge 13 of a slight convex contour.

In testimony whereof I have signed my name to this specification.

GEO. ISAAC.